(12) United States Patent
Isono (10) Patent No.: US 10,844,916 B2
(45) Date of Patent: Nov. 24, 2020

(54) BRAKE DEVICE

(71) Applicant: Toyota Jidosha Kabushiki Kaisha, Toyota (JP)

(72) Inventor: Hiroshi Isono, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 39 days.

(21) Appl. No.: 16/206,116

(22) Filed: Nov. 30, 2018

(65) Prior Publication Data

US 2019/0170200 A1 Jun. 6, 2019

(30) Foreign Application Priority Data

Dec. 4, 2017 (JP) ................................. 2017-232920

(51) Int. Cl.
*F16D 55/18* (2006.01)
*F16D 55/46* (2006.01)
(Continued)

(52) U.S. Cl.
CPC ............. *F16D 55/18* (2013.01); *F16D 55/46* (2013.01); *F16D 65/183* (2013.01); *F16D 65/186* (2013.01); *F16D 65/567* (2013.01); *F16D 2066/003* (2013.01); *F16D 2066/005* (2013.01); *F16D 2121/04* (2013.01);
(Continued)

(58) Field of Classification Search
CPC .......... F16D 55/14; F16D 55/16; F16D 55/18; F16D 55/46; F16D 55/48; F16D 65/183; F16D 65/186; F16D 65/56; F16D 65/567; F16D 2125/36; F16D 2125/38
See application file for complete search history.

(56) References Cited

U.S. PATENT DOCUMENTS 5,322,147 A * 6/1994 Clemens ................. B60T 1/062
188/264 D
5,362,138 A * 11/1994 Clemens ................. B60T 1/062
303/50

(Continued)

FOREIGN PATENT DOCUMENTS

EP 0385744 A1 * 9/1990 ............. F16D 55/15
EP 0416412 A1 * 3/1991 ............. B60T 1/065
(Continued)

*Primary Examiner* — Thomas J Williams
(74) *Attorney, Agent, or Firm* — Dinsmore & Shohl LLP (57) ABSTRACT

A brake device includes a rotating member; a fixed member; a pressing member configured to generate an engaging force between the rotating member and the fixed member; an elastic member configured to apply an elastic force to the pressing member; an engaging force application mechanism configured to apply the engaging force to the pressing member; a torque transmission member configured to transmit torque transmitted from the rotating member to the fixed member; a torque receiving member configured to receive the torque; a conversion mechanism configured to convert the torque into thrust in the axial direction and apply the thrust to the engaging force; and an actuator configured to move the torque receiving member in the axial direction by generating thrust in the torque receiving member and adjust a position of the torque receiving member along the axial direction based on a reaction force against the engaging force.

5 Claims, 5 Drawing Sheets

(51) Int. Cl.
  *F16D 65/18* (2006.01)
  *F16D 65/56* (2006.01)
  F16D 125/06 (2012.01)
  F16D 125/36 (2012.01)
  F16D 121/04 (2012.01)
  F16D 66/00 (2006.01)
  F16D 125/38 (2012.01)
  F16D 121/20 (2012.01)

(52) U.S. Cl.
  CPC ...... *F16D 2121/20* (2013.01); *F16D 2125/06* (2013.01); *F16D 2125/36* (2013.01); *F16D 2125/38* (2013.01)

(56) References Cited

U.S. PATENT DOCUMENTS 5,368,137 A * 11/1994 Clemens ................ B60T 13/16
    188/346
5,390,986 A *  2/1995 Hall, III .................... B60T 8/32
    188/71.4

FOREIGN PATENT DOCUMENTS

GB         2034834 A *  6/1980 ............ F16D 55/48
JP      2015-031387 A     2/2015

* cited by examiner

BRAKE DEVICE

CROSS-REFERENCE TO RELATED APPLICATIONS

This application claims priority to Japanese Patent Application No. 2017-232920 filed on Dec. 4, 2017, which is incorporated herein by reference in its entirety including the specification, drawings and abstract.

BACKGROUND

1. Technical Field

The disclosure relates to a brake device generating an engaging force between a rotating member and a fixed member.

2. Description of Related Art

Known in the related art is a friction brake device generating a braking force in a drive shaft by generating friction between a rotating member and a fixed member (refer to, for example, Japanese Unexamined Patent Application Publication No. 2035-031387 (JP 2015-031387 A)). The friction brake device has a brake rotor (rotating member), a brake pad (fixed member), a rotational torque transmission device, a pressing device, and a rotational torque-pressing force conversion mechanism.

The brake rotor rotates around a rotation axis. The brake pad is capable of rotating around an axis of rotation parallel to the rotation axis. The rotational torque transmission device transmits torque to the brake rotor and the brake pad between the brake rotor and the brake pad. The pressing device presses the brake pad with respect to the brake rotor by pressing a pressing member with respect to the brake pad. The rotational torque-pressing force conversion mechanism transmits the torque of the brake pad to the pressing member and converts the torque transmitted to the pressing member into a pressing force with which the pressing member presses the brake pad (thrust along a direction parallel to the rotation axis).

SUMMARY

In the friction brake device, extended use leads to wear of a friction material between the brake rotor and the brake pad, and then the clearance between the brake rotor and the brake pad changes. Accordingly, in the device disclosed in JP 2015-031387 A, the clearance change causes, for example, backlash in the rotational torque-pressing force conversion mechanism that converts torque into a pressing force. A torque shock results from the backlash during braking, and then the braking force is unstable even when the brake pad is pressed with a predetermined pressing force.

The disclosure provides a brake device capable of maintaining a stable braking force even in the event of extended use.

An aspect of the disclosure relates to a brake device. The brake device includes a rotating member, a fixed member, a pressing member, an elastic member, an engaging force application mechanism, a torque transmission member, a torque receiving member, a conversion mechanism, and an actuator. The rotating member is configured to be rotated by torque transmitted from a drive force source. The fixed member is disposed to face the rotating member. The pressing member is configured to generate an engaging force between the rotating member and the fixed member by being pressed in an axial direction of a rotation axis of the rotating member. The elastic member is configured to apply an elastic force against the pressing of the pressing member to the pressing member. The engaging force application mechanism is configured to apply the engaging force to the pressing member. The torque transmission member is configured to transmit torque transmitted from the rotating member to the fixed member, and the fixed member includes a play along a rotation direction of the rotating member. The torque receiving member is configured to receive the torque transmitted from the torque transmission member, and rotation of the torque receiving member in a circumferential direction about the axis is blocked. The conversion mechanism is configured to convert the torque received by the torque receiving member into thrust in the axial direction and apply the thrust resulting from the conversion to the engaging force. The actuator is configured to move the torque receiving member in the axial direction by generating thrust resulting from rotational-to-linear motion conversion in the torque receiving member and adjust a position of the torque receiving member along the axial direction based on a reaction force against the engaging force.

In the brake device according to the aspect of the disclosure, the actuator may be configured to hold the torque receiving member at each of a braking position as a position along the axial direction where the engaging force is generated and an initial position as a position along the axial direction where the engaging force is released and hold the torque receiving member at the braking position when a parking brake is operated.

In the brake device according to the aspect of the disclosure, the actuator may be configured to have a detection unit configured to determine the torque transmitted from the rotating member or an axial force in the axial direction resulting from conversion of the torque and adjust tire initial position of the torque receiving member based on the torque or the axial force determined by the detection unit when the parking brake is released. P In the brake device according to the aspect of the disclosure, the engaging force application mechanism may be provided with a hydraulic brake mechanism configured to generate the engaging force by hydraulic pressure supply.

In the brake device according to the aspect of the disclosure, the pressing member may have an armature, and the engaging force application mechanism may have a coil and may generate tire engaging force by moving the armature in the axial direction with a magnetic adsorption force generated by energization of the coil.

According to the aspect of the disclosure, the actuator is provided that adjusts the position of the torque receiving member based on the reaction force against the engaging force generated between the rotating member and the fixed member. The clearance between the rotating member and the fixed member can be reduced by the position of the torque receiving member being adjusted. Accordingly, backlash generated in the conversion mechanism can be suppressed or prevented even when the clearance changes. As a result, a stable braking force can be maintained even in the event of extended use.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
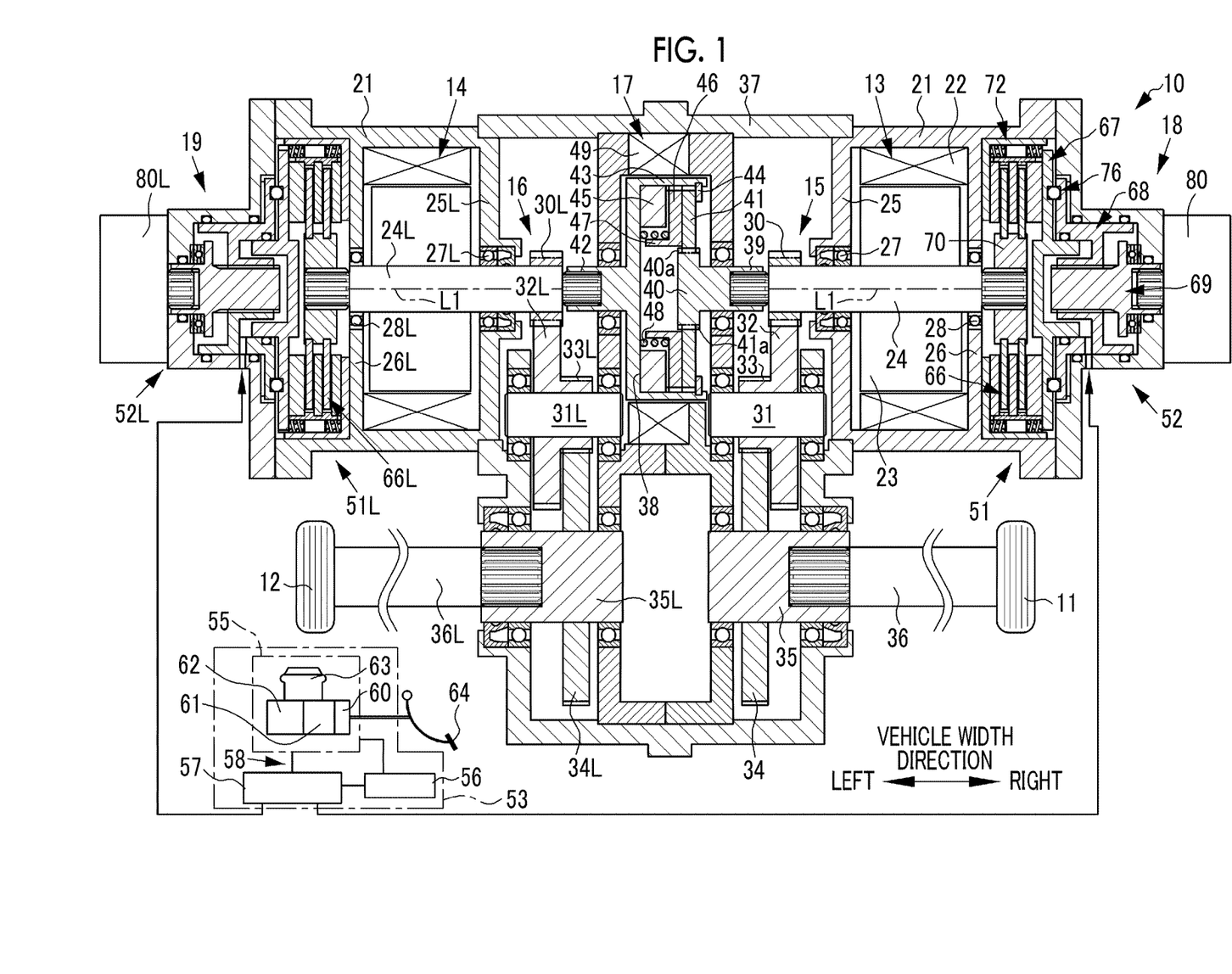
FIG. 1 is a cross-sectional view illustrating a drive device adopting an example of a brake device according to an embodiment.

FIG. 1 is a cross-sectional view illustrating a drive device adopting an example of a brake device according to an embodiment of the disclosure. As Illustrated in FIG. 1, a drive device 10 is mounted in a vehicle and includes a first drive wheel 11 disposed on the right side in the width direction of the vehicle, a second drive wheel 12 disposed on the left side, a first motor 13 for the first drive wheel 11, a second motor 14 for the second drive wheel 12, a first power transmission mechanism 15 for the first drive wheel 11, a second power transmission mechanism 16 for the second drive wheel 12, a differential mechanism 17, a first brake mechanism 18 for the first drive wheel 11, and a second brake mechanism 19 for the second drive wheel 12. The right and the left in the vehicle width direction illustrated in FIG. 1 are, for example, the right-left direction in a ease where the vehicle is viewed from the back (rear) in FIG. 1. The right-left direction is reversed in a case where a diagram in which the vehicle is viewed from the front is used as FIG. 1.

The first drive wheel 11, the first motor 13, the first power transmission mechanism 15, the first brake mechanism 18, the second drive wheel 12, the second motor 14, the second power transmission mechanism 16, and the second brake mechanism 19 are symmetrically disposed on both sides across the middle in the vehicle width direction (here, "symmetrical" also means "substantially symmetrical"). Accordingly, in the following description, the first drive wheel 11, the first motor 13, the first power transmission mechanism 15, and the first brake mechanism 18 disposed on the right side in the vehicle width direction will be described. The mechanisms disposed on the left side have the same or similar configurations as the mechanisms disposed on the right side, and the same numbers with "L" as a suffix are given to the same members so that detailed description thereof is omitted here. The first motor 13 and the second motor 14 are examples of a drive force source The first motor 13 is a motor that generates a drive force for traveling transmitted to the first drive wheel 11 and a motor that has an electric power generation function. A permanent magnet-type synchronous motor or the like constitutes the first motor 13. Specifically, an annular stator 22 is attached in a motor housing 21 formed in a drum shape, and a rotor 23 is provided in the stator 22. The rotor 23 is integrally connected to an output shaft 24, and the output shaft 24 rotates about a rotation axis L1 by driving of the first motor 13. The output shaft 24 is rotatably supported via bearings 27, 28 provided on partition walls 25, 26 on both sides of the motor housing 21.

The first power transmission mechanism 15 includes an output gear 30, a countershaft 31, a counter driven gear 32, a pinion gear 33, and a final reduction gear 34. The first power transmission mechanism 15 transmits the drive force that is output from the first motor 13 to the first drive wheel 11.

The output gear 30 is connected to the left end portion of the output shaft 24 in the vehicle width direction. The countershaft 31 is disposed in parallel to the output shaft 24. A two-stage gear having the pinion gear 33 and the counter driven gear 32 coaxially and integrally attached is connected to the countershaft 31. The counter driven gear 32 meshes with the output gear 30. The pinion gear 33 is formed to be smaller in diameter than the counter driven gear 32. The final reduction gear 34 larger in diameter than the pinion gear 33 meshes with the pinion gear 33.

The final reduction gear 34 is connected to a sub-shaft 35 disposed in parallel to the countershaft 31. The sub-shaft 35 is connected to a first end of a drive shaft 36 by spline coupling. As is the case with known drive shafts, the drive shaft 36 has a connection mechanism (not illustrated) such as a constant velocity joint for changing the rotation axes of both ends in the height direction of the vehicle. The first drive wheel 11 is connected to a second end of the drive shaft 36. The drive shaft 36 is disposed coaxially with the sub-shaft 35.

A reduction mechanism that increases the torque of the output gear 30 in accordance with the gear ratio between the output gear 30 and the counter driven gear 32 and the gear ratio between the pinion gear 33 and the final reduction gear 34 and transmits the torque to the drive shaft 36 may constitute the first power transmission mechanism 15 according to the embodiment of the disclosure.

The first power transmission mechanism 15 is accommodated in a center housing 37. The motor housing 21 described above is attached to the center housing 37 on the right side in the vehicle width direction. The countershaft 31 and the sub-shaft 35 are rotatably supported via a bearing by a partition wall attached to the center housing 37.

The output shaft 24 of the first motor 13 is disposed coaxially with an output shaft 24L of the second motor 14, and the drive shaft 36 of the first power transmission mechanism 15 is disposed coaxially with a drive shaft 36L of the second power transmission mechanism 16. The countershaft 31 of the first power transmission mechanism 15 is disposed coaxially with a countershaft 31L of the second power transmission mechanism 16, and the sub-shaft 35 of the first power transmission mechanism 15 is disposed coaxially with a sub-shaft 35L of the second power transmission mechanism 16.

The differential mechanism 17 is a mechanism capable of making the torque transmitted to the output shaft 24 of the first power transmission mechanism 15 and the torque transmitted to the output shaft 24L of the second power transmission mechanism 16 differ from each other. The differential mechanism 17 includes, for example, a connecting shaft 39, a flange portion 40, a fastening plate 41, an extending shaft 42, an accommodating portion 43, a snap ring 44, a yoke 45, a pressing plate 46, a cylindrical portion 47, a coil spring 48, and a coil 49.

The connecting shaft 39 is connected to a first end of the output shaft 24 by spline coupling. The flange portion 40 is formed on the same axis as the rotation axis L1 and on the connecting shaft 39. Spline teeth 40a are formed on the outer peripheral surface of the flange portion 40. The annular fastening plate 41 is disposed concentrically with the flange portion 40. Spline teeth 41a are formed on the inner peripheral surface of the fastening plate 41. The flange portion 40 and the fastening plate 41 are movable in the axial direction of the rotation axis L1 by engagement of the spline teeth 40a, 41a.

The extending shaft 42 is connected to a first end of the output shaft 24L of the second motor 14 by spline coupling. The accommodating portion 43 is formed integrally with the extending shaft 42 and between the extending shaft 42 and the connecting shaft 39. The accommodating portion 43 has a recessed portion 38 having a C-shaped cross section and having an open side toward the output shaft 24 (in this specification, "C-shaped" also means "substantially C-shaped"). The fastening plate 41 is rotatably attached to the recessed portion 38. The snap ring 44 for preventing the fastening plate 41 from escaping from the recessed portion 38 is attached on the open side of the recessed portion 38.

The annular yoke 45 is integrally attached to the recessed portion 38, and the annular pressing plate 46 is disposed between the yoke 45 and the fastening plate 41. The pressing plate 46 and the recessed portion 38 are spline-coupled. In other words, the pressing plate 46 rotates integrally with the recessed portion 38 and is capable of moving in the axial direction in the recessed portion 38.

The pressing plate 46 is made of a magnetic material, and the cylindrical portion 47 extending to the bottom surface side of the recessed portion 38 in the axial direction is formed in the inner diameter portion. The coil spring 48 is disposed so as to be compressed on the outer periphery of the cylindrical portion 47 and between the bottom surface of the recessed portion 38 and the pressing plate 46, and biases the pressing plate 46 toward the fastening plate 4i in the axial direction. Further, the coil 49 is disposed on the outer periphery of the accommodating portion 43.

The coil 49 generates a magnetic force against the elastic force of the coil spring 48 by being energized. The magnetic force acts on the pressing plate 46 such that the pressing plate 46 leaves the fastening plate 41 along the axial direction. In a case where the coil 49 is not energized, the pressing plate 46 is pressed against the fastening plate 41 by the elastic force of the coil spring 48. A frictional force corresponding to the elastic force of the coil spring 48 is generated between the pressing plate 46 and the fastening plate 41. The frictional force is determined, to the extent that the pressing plate 46 and the fastening plate 41 do trot rotate relative to each other, by a torque difference or a rotation speed difference acting on the right and left output shafts 24 in the case of straight traveling or traveling on a traveling path having a relatively large turning radius. The differential mechanism 17 constitutes a friction clutch in which the coil 49 is an electromagnetic actuator.

The first brake mechanism 18 includes a service brake mechanism 81 and a parking brake mechanism 52. The parking brake mechanism 52 is operated during parking or stopping for braking force retention. Tire service brake mechanism 51 includes a hydraulic brake mechanism 53.

The hydraulic brake mechanism 53 includes, for example, a master cylinder unit 55, a power hydraulic pressure source 56, a hydraulic actuator 57, and a hydraulic circuit 58 connecting the master cylinder unit 55, the power hydraulic pressure source 56, and the hydraulic actuator 57.

The power hydraulic pressure source 56 has an accumulator (not illustrated), a pressure sensor (not illustrated), a motor (not illustrated), a pump (not illustrated), and so on. The power hydraulic pressure source 56 generates a brake fluid pressure applied to the master cylinder unit 55 by accumulating a brake fluid pressure within a predetermined pressure range in the accumulator. The pressure sensor performs pressure detection such that the brake fluid pressure (accumulator pressure) accumulated in the accumulator is within a predetermined pressure range. When the accumulator pressure is low, pump-based brake fluid suction and discharge operations are performed by driving of the motor.

The master cylinder unit 55 may be, for example, a hydraulic booster-attached master cylinder. The hydraulic booster-attached master cylinder includes a hydraulic booster 60, a master cylinder 61, a regulator 62, and a reservoir 63. The brake fluid of the master cylinder 61 is pressurized when a brake pedal 64 is depressed. The hydraulic booster 60 is connected to the brake pedal 64, amplifies the pedaling force that is applied to the brake pedal 64, and transmits the amplified pedaling force to the master cylinder 61. The pedaling force of the brake pedal 64 is amplified by the brake fluid being supplied from the power hydraulic pressure source 56 to the hydraulic booster 60 via the regulator 62. The master cylinder 61 generates a master cylinder pressure having a predetermined boost ratio with respect to the pedaling force.

The master cylinder 61 communicates with the reservoir 63 when depression of the brake pedal 64 is released. The regulator 62 communicates with both the reservoir 63 and the accumulator of the power hydraulic pressure source 56. The regulator 62 generates a hydraulic pressure (regulator pressure) equal to the master cylinder pressure by using the reservoir 63 as a low pressure source and the accumulator as a high pressure source (here, "equal" also means "almost equal").

The hydraulic actuator 57 appropriately adjusts the hydraulic pressure of the brake fluid supplied from the power hydraulic pressure source 56 or the master cylinder unit 55 and transmits the brake fluid to a wheel cylinder The wheel cylinder is provided in each of the service brake mechanism 51, 51L (described in detail later). Although the hydraulic brake mechanism 53 is used in the present embodiment, the disclosure is not limited to the hydraulic brake mechanism 53, and a pneumatic brake mechanism or the like may be used instead. The hydraulic brake mechanism 53 is an example of an engaging force application mechanism.

Figure 2:
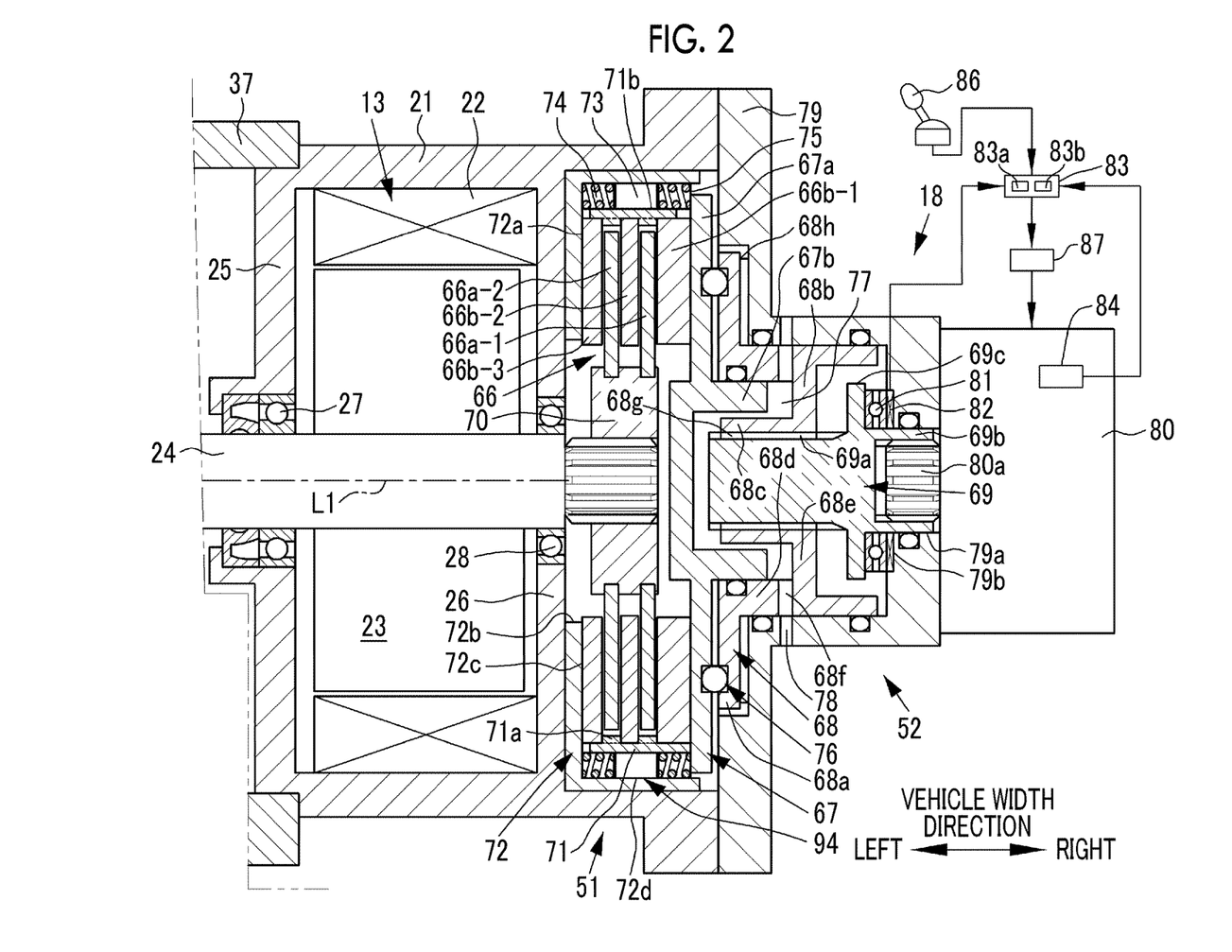
FIG. 2 is an enlarged cross-sectional view illustrating a main part of the drive device illustrated In FIG. 1.

FIG. 2 is an enlarged cross-sectional view illustrating a main part of the drive device illustrated in FIG. 1. As illustrated in FIG. 2, the service brake mechanism 51 includes a friction plate 66, a pressing member 67, a torque receiving member 68, a conversion mechanism 76, a screw shaft 69, and the like.

The friction plate 66 has a surface formed of a friction material, and includes an annular rotating plate 66a (66a-1, 66a-2) and an annular fixed plate 66b (66b-1, 66b-2, 66b-3). In the above embodiment, the rotating plate 66a is composed of the first rotating plate 66a-1 and tho second rotating plate 66a-2, and the fixed plate 66b is composed of the first fixed plate 66b-1, the second fixed plate 66b-2, and the third fixed plate 66b-3. One rotating plate 66a is disposed between three fixed plates 66b. The number and disposition order of the friction plates 66 are not limited to the above-described embodiment.

The rotating plate 66a is fixed to a boss member 70. The boss member 70 is connected to the output shaft 24 by spline coupling and rotates together with the output shaft 24. A movable ring 71 is disposed on the outer diameter side of the fixed plate 66b. The movable ring 71 has a coupling portion 71a connecting the fixed plate 66b by spline coupling on the inner diameter side. The coupling portion 71a supports the fixed plate 66b movably in the axial direction of the rotation axis L1.

The rotating plate 66a and the fixed plate 66b are alternately disposed in the axial direction and constitute a multi-plate friction plate as a result, in the above embodiment, a pressing plate 67a disposed on the pressing member 67 side is pressed toward the left in the vehicle width direction. As a result, a friction-based engaging force is generated between the rotating plate 66a and tire fixed plate 66b, and a braking force is generated in the output shaft 24 by the engaging force. Alternatively, a structure may be adopted in which a friction-based engaging force is generated by the rotating plate 66a being moved toward the fixed plate 66b. Also, a configuration may be adopted in which a friction-based engaging force is generated by the rotating plate 66a being sandwiched by a pair of fixed members. The rotating plate 66a is an example of a rotating member. The fixed plate 66b is an example of a fixed member.

An annular fixed ring 72 is disposed on the outer diameter side of the movable ring 71. The fixed ring 72 is fixed to the motor housing 21. A recessed portion 72a having a C-shaped cross section and having an open side toward the right side in the vehicle width direction is formed in the fixed ring 72. The friction plate 66 and the movable ring 71 are accommodated in the recessed portion 72a. The recessed portion 72a has a receiving portion 72c and an opening 72b for insertion of the output shaft 24. The receiving portion 72c is the left end portion of the recessed portion 72a facing the pressing plate 67a across the friction plate 66, and receives the pressing force that is transmitted from the pressing plate 67a. The opening 72b is formed in the middle of the receiving portion 72c in the radial direction.

A straight groove 94 is formed between an outer peripheral portion 71b of the movable ring 71 and an inner peripheral portion 72d of the fixed ring 72. The straight groove 94 is a groove extending in the axial direction of die rotation axis L1. A guide pin 73 is inserted in the straight groove 94. The guide pin 73 is a pin that has a peripheral surface parallel to the axial direction. The straight groove 94 has a slight play in the circumferential direction about the axis with respect to the guide pin 73, limits rotation of the movable ring 71 beyond the play, and allows the movable ring 71 to move in the axial direction with respect to the fixed ring 72.

A pair of return springs 74, 75 is provided such that the return springs 74, 75 are respectively disposed on both sides in the axial direction across the guide pin 73. The return spring 74 is disposed between the guide pin 73 and the receiving portion 72c, and the return spring 75 is disposed between the guide pin 73 and the pressing plate 67a. The return springs 74, 75 bias the pressing member 67 with an elastic force against the pressing force transmitted from the pressing member 67. An elastic member elastically deformable in tire axial direction may be used in place of the return springs 74, 75. The return springs 74, 75 are examples of an elastic member.

The pressing member 67 has the pressing plate 67a and a cylinder portion 67b. The pressing plate 67a is formed in a flange shape and is disposed at a position facing the receiving portion 72c across the friction plate 66. The pressing plate 67a presses the first fixed plate 66b-1 and the return spring 75 toward the left in the vehicle width direction as described above. The cylinder portion 67b has a C-shaped cross section and has an open side toward the right side in the vehicle width direction. The pressing plate 67a is fixed to the outer periphery of the cylinder portion 67b and to the left of the cylinder portion 67b in the vehicle width direction. The screw shaft 69 and a nut portion 68c of the torque receiving member 68 (described in detail later) are disposed in the cylinder portion 67b.

The torque receiving member 68 is incorporated in a brake housing 79 such that rotation in the circumferential direction about the axis of the rotation axis L1 is stopped and the rotation axis L1 can be moved in the axial direction. The brake housing 79 is fixed to the motor housing 21. The torque receiving member 68 has a torque receiving plate 68a, a pressure receiving piston portion 68b, and a nut portion 68c. The rotation stopping of the torque receiving member 68 may be performed by a spline coupling portion 68b provided between the torque receiving member 68 and the inner wall of the brake housing 79.

The torque receiving plate 68a is disposed on the right side in the vehicle width direction with respect to the pressing plate 67a and so as to face the pressing plate 67a. The conversion mechanism 76 is provided between the torque receiving plate 68a and the pressing plate 67a. By receiving the torque transmitted from the rotating plate 66a, the conversion mechanism 76 converts the torque into a thrust along the axial direction of the rotation axis L1 and increases the thrust. In other words, the movable ring 71 has a play in the circumferential direction about the axis of the rotation axis L1 between the movable ring 71 and the guide pin 73. Rotation of the torque receiving member 68 in the circumferential direction with respect to the axis and a movement of the torque receiving member 68 in the axial direction are stopped by a feed screw mechanism (described in detail later). Accordingly, once the torque transmitted from the rotating plate 66a is transmitted to the pressing member 67 via the first fixed plate 66b-1. The conversion mechanism 76 converts the torque transmitted to the pressing member 67 into a pressing force directed to the left in the vehicle width direction and increases the pressing force.

The pressure receiving piston portion 68b has a tube portion 68d sliding on the outer periphery of the cylinder portion 67b and a partition wall 68e sealing the inside of the cylinder portion 67b, and forms a wheel cylinder 77 between the cylinder portion 67b and the partition wall 68e. The torque receiving member 68 includes the pressure receiving piston portion 68b, and a movement of the pressure receiving piston portion 68b in the axial direction of the rotation axis L1 is stopped by the nut portion 68c (described in detail later) being screwed with the screw shaft 69. The spline coupling portion 68h, the nut portion 68c, and the screw shaft 69 constitute a feed screw mechanism converting the rotational motion that is transmitted from a rotor shaft 80a into linear motion and transmitting the linear motion to the torque receiving member 68.

An oil passage 68f is formed in the torque receiving member 68. An oil passage 78 communicating with the oil passage 68f is formed in the brake housing 79. The torque receiving member 68 is moved m the axial direction of the rotation axis L1 by the feed screw mechanism, and thus the oil passage 68f is formed to be larger in diameter than the oil passage 78 in view thereof.

Pressure oil is supplied from the hydraulic actuator 57 of the hydraulic brake mechanism 53 to the wheel cylinder 77 via the oil passage 78 and the oil passage 68f. Once the pressure oil is supplied to the wheel cylinder 77 through the oil passages 68f, 78, the partition wall 68e acts as a fixed wall, and thus the cylinder portion 67b is pressed toward the left in the vehicle width direction. As a result, the pressing plate 67a is pressed to the left in the vehicle width direction with respect to the torque receiving member 68, and an engaging force is generated between the rotating plate 66a and the fixed plate 66b.

The pressing member 67 is moved from a position where the pressing member 67 abuts against five torque receiving member 68 via the conversion mechanism 76 as a result of the pressure oil supply toward a braking position (left position in the vehicle width direction) where an engaging force is generated between the rotating plate 66a and tire fixed plate 66b. The position where the pressing member 67 abuts against the torque receiving member 68 via the conversion mechanism 76 is a braking force release position. The braking position appropriately varies with the braking force that is needed.

The nut portion 68c has a female screw 68g on the inner periphery thereof, and the female screw 68g meshes with a male screw 69a formed on the outer periphery of the screw shaft 69. The screw shaft 69 is connected to the rotor shaft 80a of a parking motor 80. The connection is performed by spline coupling. In other words, the screw shaft 69 is connected to the rotor shaft 80a so as to be movable in the axial direction of the rotation axis L1 and capable of transmitting torque in the rotation direction about the axis of the rotation axis L1.

The screw shaft 69 moves the torque receiving member 68 along the axial direction by driving of the parking motor 80. The movement of the torque receiving member 68 is performed between a braking position where the pressing member 67 presses the rotating plate 66a toward the fixed plate 66b and a release position where the pressing is released. The braking position at this time, which is one of the braking positions of the service brake mechanism 51, is a position where an engaging force needed for maintaining the stopped state of the vehicle is obtained. The release position corresponds to an initial position (described in detail later), and the initial position appropriately varies with adjustment control (described in detail later).

The outer periphery of a rear end 69b of the screw shaft 69 is fitted into an opening 79a of the brake housing 79. The fitting is performed such that a movement is possible in the axial direction of the output shaft 24, rotation is possible in the circumferential direction about the output shaft 24, and a liquid-tight state can be ensured by an oil seal or the like. The parking motor 80, the screw shaft 69, the torque receiving member 68, and so on constitute the parking brake mechanism 52.

The parking brake mechanism 52 is configured to maintain frictional engagement between the rotating plate 66a and the fixed plate 66b even in a state where the power of the vehicle is OFF. Specifically, the parking brake mechanism 52 moves the torque receiving member 68 toward the braking position by, for example, rotating the parking motor 80 forward.

The screw shaft 69 has a flange portion 69c on the outer periphery thereof, and a thrust bearing 81 or the like is provided in the flange portion 69c. The thrust bearing 81 is disposed between the flange portion 69c and a facing portion 79b of tire brake housing 79 forcing the flange portion 69c in the vehicle width direction, and receives the force (thrust) that acts in the axial direction of the output shaft 24. A detection unit 82 for detecting the axial force that is transmitted along the axial direction from tire screw shaft 69 is attached to the facing portion 79b.

The detection unit 82 includes, for example, a pair of pressing plates (not illustrated) and a strain gauge (not illustrated), the pressing plates being disposed to face each other in the vehicle width direction, and the detection unit 82 is constituted by the strain gauge being sandwiched by the pressing plates. The thrust bearing 81 abuts against one of the pressing plates, and the facing portion 79b abuts against the other pressing plate. When an axial force (load) in the axial direction is applied to the screw shaft 69, the outer diameter side of the flange portion 69c bends more than the inner diameter side toward the right in Use vehicle width direction. The thrust bearing 81 receives the deformation caused by the deflection of the flange portion 69c as an axial force. In the above embodiment, the pressing plates and the strain gauge are formed in a ring shape having an opening through which the rear end 69b of the screw shaft 69 is allowed to pass. A plurality of the strain gauges may be provided at positions equally dividing the circumference about the axis.

The detection unit 82 detects the amount of the axial displacement of the thrust bearing 81 that occurs when an axial force in the axial direction is applied to the screw shaft 69, and sends information on the detected displacement amount to a controller 83. The controller 83 has a determination unit 83a, and the determination unit 83a determines the axial force based on the displacement amount. The detection unit 82 is not limited to the detection of the axial deformation of the screw shaft 69, and may be provided on, for example, the right side surface of the pressing plate 67a in the vehicle width direction to detect a torsional-direction deformation amount of the pressing plate 67a. The detection unit 82 is not limited to the strain gauge. For example, a detection unit using a piezoelectric element or a pressure-sensitive element may be used instead.

In a case where parking lock is needed, example of which include a case where a shift lever 86 is switched to a parking position, the controller 83 performs energization on a motor driver 87 for forward rotation of the parking motor 80 while monitoring the axial force determined by the determination unit 83a. As a result, the torque receiving member 68 moves along the axial direction and toward the braking position. In other words, the parking motor 80 applies a torque for generating a thrust along the axial direction to the torque receiving member 68. As a result, a friction-based engaging force is generated in the friction plate 66.

The engaging force generated in the friction plate 66 is increased when the thrust resulting from the driving of the parking motor 80 is increased. The reaction force against the engaging force deforms the screw shaft 69 in the axial direction. Once the amount of the deformation reaches a deformation amount that allows the parking lock, the determination unit 83a determines the axial force corresponding to the deformation amount, and the controller 83 stops energizing the motor driver 87. Then, the driving of the parking motor 80 is stopped. As a result, the rotating plate 66a and the fixed plate 66b are maintained in a pressed state. Accordingly, the braking force can be maintained even in a case where the power of the vehicle is OFF.

Once the parking brake is released, the controller 83 moves the torque receiving member 68 toward the release position while monitoring the axial force determined by the determination unit 83a by, for example, energizing the motor driver 87 for reverse rotation of the parking motor 80. Subsequently, the controller 83 stops energizing the motor driver 87 once the determination unit 83a determines a deformation amount (axial force) at which the parking lock can be released.

The parking motor 80 has a rotation angle detection unit 84 that detects the rotation angle of the rotor shaft 80a. The rotation angle detection unit 84 sends information on the detected rotation angle to the controller 83. The controller 83 has a storage unit 83b. Each time the parking lock is released, the controller 83 stores the rotation angle information at the point in time when the axial force at which the parking lock can be released is obtained as the initial position in the storage unit 83b. In other words, based on the rotation angle of the rotor shaft 80a, the controller 83 adjusts the axial initial position of the nut portion 68c constituting the feed screw mechanism, that is, the torque receiving member 68, that is, the release position of the engaging force based on the degree of wear of the friction plate 66.

Accordingly, it is possible to suppress or prevent the backlash of the conversion mechanism 76 that is caused by a change in the clearance of the friction surface of the friction plate 66 attributable to extended use. In other words, as the clearance of the friction surface of the friction plate 66 widens, the initial position is adjusted such that the torque receiving member 68 approaches the braking position as a result of initial position adjustment. Since the pressing member 67 is pressed by the engaging force application mechanism with reference to the initial position of the torque receiving member 68 adjusted in accordance with the clearance of the friction surface of the friction plate 66, the operation of the service brake mechanism 51 allows the braking force of a normal brake to be maintained at the same braking force at all times. An actuator such as an electric cylinder may be used in place of the feed screw mechanism and the parking motor 80. The feed screw mechanism, the parking motor 80, the detection unit 82, the controller 83, and so on are examples of an actuator.

Figure 3:
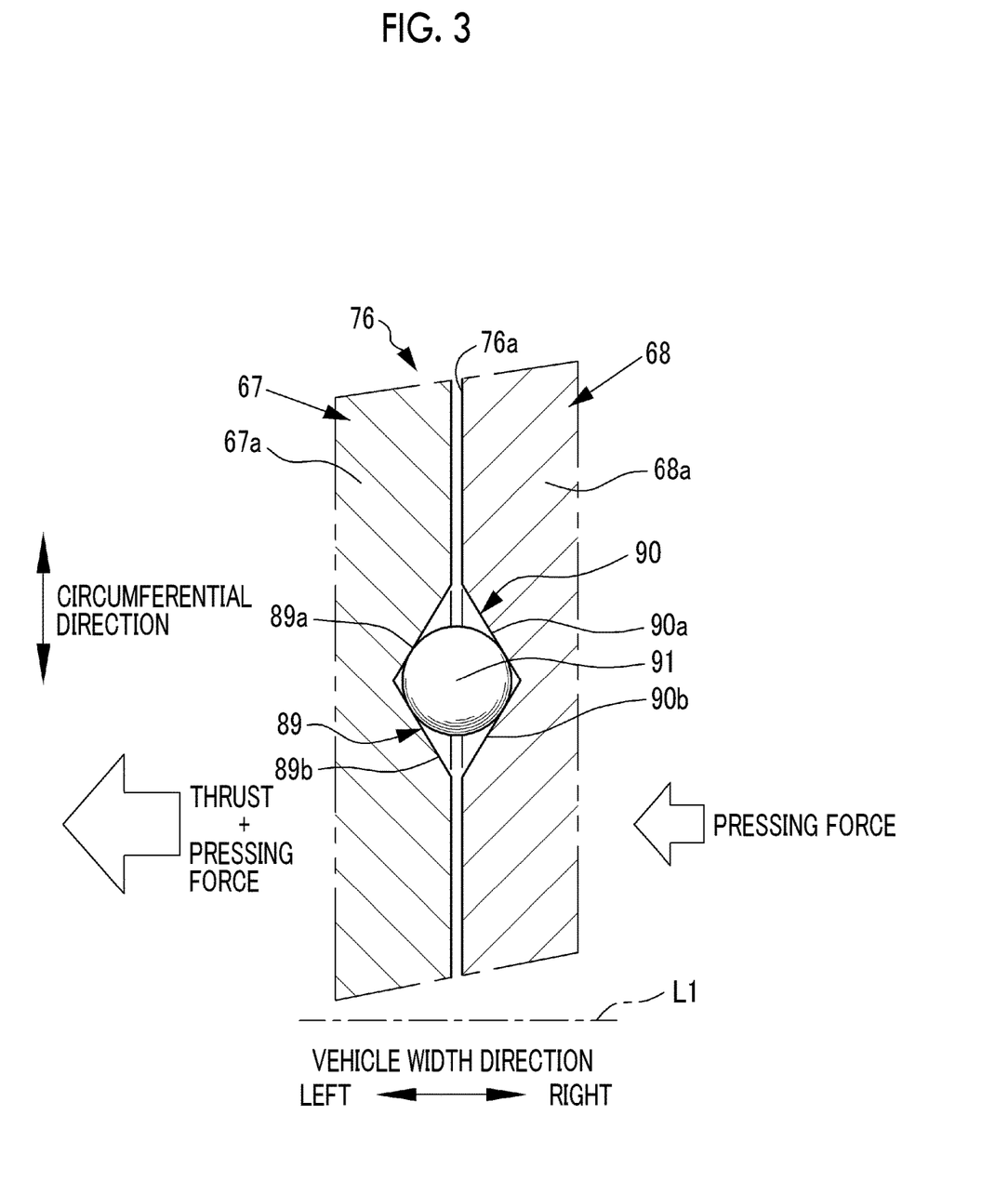
FIG. 3 is a cross-sectional view illustrating an example of a conversion mechanism illustrated in FIG. 2.

FIG. 3 is a cross-sectional view illustrating an example of the conversion mechanism illustrated in FIG. 2. As illustrated in FIG. 3, the conversion mechanism 76 is provided between the torque receiving plate 68a and the pressing plate 67a. A plurality of the conversion mechanisms 76 is provided such that the conversion mechanisms 76 are disposed at predetermined intervals in the circumferential direction about the rotation axis L1. The conversion mechanism 76 includes a first groove 89 provided in the pressing plate 67a, a second groove 90 provided in the torque receiving plate 68a, and a sphere 91 inserted between the first groove 89 and the second groove 90. Each of the first groove 89 and the second groove 90 has an L-shaped cross section (in this specification, "L-shaped" also means "substantially L-shaped"). The sphere 91 is formed of a material such as a substantially rigid metal.

The first groove 89 has a first cam surface 89a and a second cam surface 89b connected to the first cam surface 89a. The second groove 90 has a third cam surface 90a and a fourth cam surface 90b connected to the third cam surface 90a. The sphere 91 is inserted between the first groove 89 and the second groove 90 so as to be in point contact with each of the first cam surface 89a, the second cam surface 89b, the third cam surface 90a, and the fourth cam surface 90b. The sizes, angles, and so on of the L-shaped cross sections of the sphere 91, the first groove 89, and the second groove 90 are set in advance such that the pressing plate 67a and the torque receiving plate 68a have a slight clearance 76a therebetween when the sphere 91 is inserted between the first groove 89 and the second groove 90.

The first cam surface 89a and the fourth cam surface 90b are surfaces inclined such that one of the first cam surface 89a and the fourth cam surface 90b approaches the other when a torque toward the circumferential direction is generated in the pressing plate 67a. The second cam surface 89b and the third cam surface 90a are surfaces inclined such that one of the second cam surface 89b and the third cam surface 90a approaches the other when a torque toward the circumferential direction is generated in the pressing plate 67a. Specifically, the first cam surface 89a and the fourth cam surface 90b may be parallel The second cam surface 89b and the third cam surface 90a may be parallel. The first cam surface 89a and the third cam surface 90a may have the same inclination angle with respect to a reference plane along the circumferential direction. The first cam surface 89a, the second cam surface 89b, the third cam surface 90a, and the fourth cam surface 90b constitute a front cam.

The torque that is transmitted from the rotating plate 66a during braking is applied to the pressing plate 67a in the circumferential direction. The pressing force (thrust) that is attributable to the hydraulic pressure which is obtained from the hydraulic brake mechanism 53 during braking is applied to the torque receiving plate 68a toward the left in the vehicle width direction. Upon receiving the torque transmitted from the rotating plate 66a during braking, the conversion mechanism 76 converts the torque into a thrust directed to the left in the vehicle width direction, and increases the pressing force by adding the thrust to the pressing force.

Figure 4:
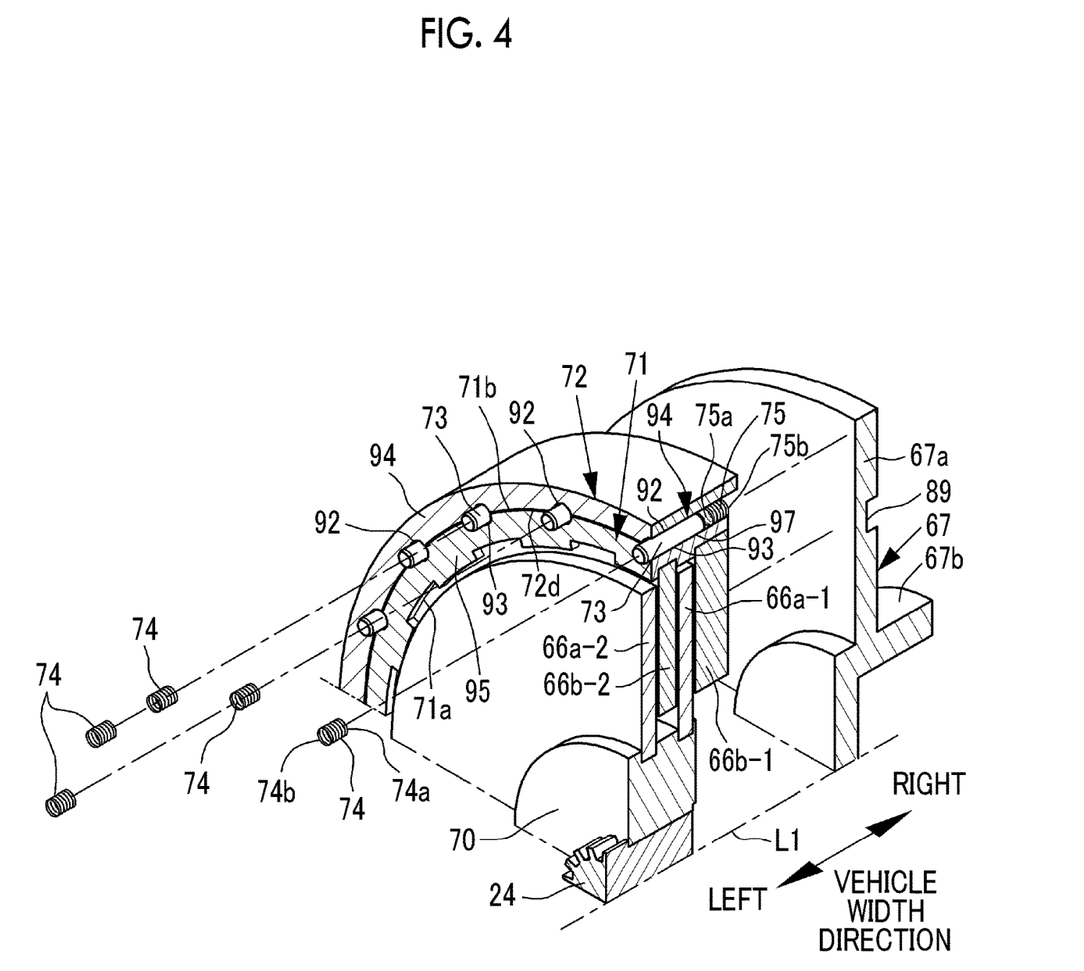
FIG. 4 is a perspective view of a main part illustrating an example of a guide pin illustrated in FIG. 2.

FIG. 4 is a perspective view of a main part illustrating an example of the guide pin illustrated in FIG. 2. As illustrated in FIG. 4, a plurality of the straight grooves 94 is provided such that the straight grooves 94 are formed at, for example, positions equally dividing the circumference about the axis. The straight groove 94 is composed of, for example, an inner peripheral groove 92 and an outer peripheral groove 93. The inner peripheral groove 92 is formed in the inner peripheral portion 72d of the fixed ring 72. The outer peripheral groove 93 is formed in the outer peripheral portion 71b of the movable ring 71.

The inner peripheral groove 92 and the outer peripheral groove 93 together constitute the straight groove 94 parallel to the axial direction of the rotation axis L1. The straight groove 94 has a slight play in the circumferential direction about the axis with respect to the guide pin 73, limits rotation of the movable ring 71 in the circumferential direction beyond the play, and allows the movable ring 71 to move in the axial direction with respect to the fixed ring 72. Although the guide pin 73 according to the present embodiment is a parallel pin having a circular cross section, the disclosure is not limited thereto and, for example, a parallel pin with a rectangular cross section may be used instead. In this case, the inner peripheral groove 92 and the outer peripheral groove 93 may have a cross-sectional shape that fits into the cross-sectional shape of the guide pin 73. The guide pin 73 may be replaced with a sphere. A plurality of the spheres may be used for each straight groove 94. The straight groove 94, the guide pin 73, and so on are examples of a torque transmission member.

In the straight groove 94. The return springs 74, 75 are respectively inserted on both sides of the guide pin 73. The return springs 74, 75 block the guide pin 73 from moving in the axial direction and apply an elastic force against a movement of the pressing member 67 to the pressing member 67. For example, a right end 74a of the return spring 74 in the vehicle width direction abuts against the left end of the guide pin 73 in the vehicle width direction. A left end 74b of the return spring 74 in the vehicle width direction abuts against the receiving portion 72c (see FIG. 2) of the fixed ring 72. A left end 75 a of the return spring 75 in the vehicle width direction abuts against the right end of the guide pin 73 in the vehicle width direction. A right end 75b of the return spring 75 in the vehicle width direction abuts against the pressing plate 67a. The diameter of the return springs 74, 75 may be equal to or less than the diameter of the guide pin 73. The return springs 74, 75 may be compression springs and those having the same size and elastic force may be used as the return springs 74,75.

The return springs 74, 75 act to reduce the backlash that is generated in the path, through which a pressing force directed to the friction plate 66 is transmitted. Although the return springs 74, 75 are disposed on both sides in the axial direction across the guide pin 73, the disclosure is not limited thereto, and the return springs 74, 75 may be disposed at any positions in the circumferential direction about the rotation axis L1 insofar as the position is a joint between the fixed ring 72 and the movable, ring 71. In this case, a stopper for preventing the guide pin 73 from escaping may be provided in the inner peripheral groove 92 and die outer peripheral groove 93. The stopper may be provided with a play in the axial direction such that the inner peripheral groove 92 moves in the axial direction with respect to the outer peripheral groove 93.

Figure 5:
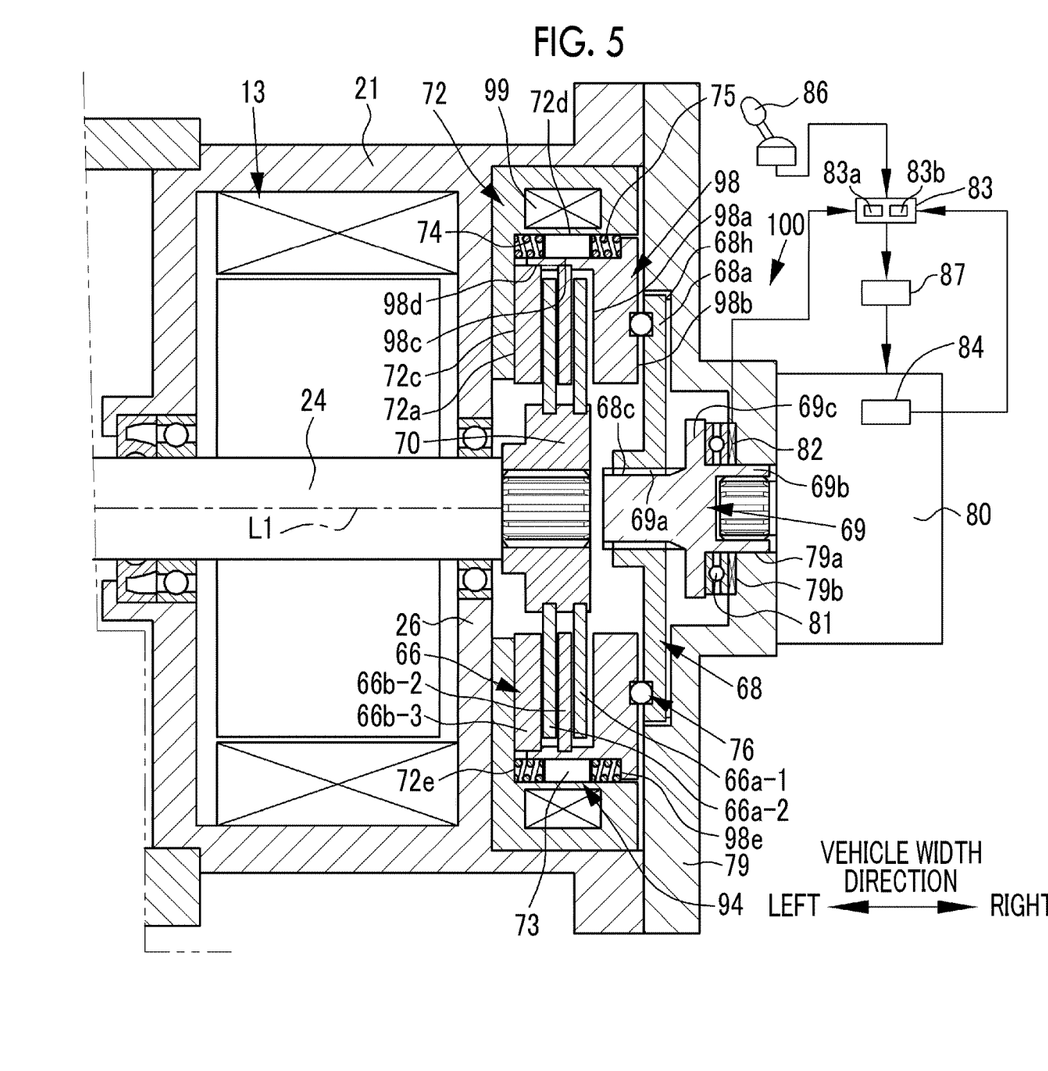
FIG. 5 is a cross-sectional view illustrating another embodiment of the engaging force application mechanism.

FIG. 5 is a cross-sectional view illustrating another embodiment of the engaging force application mechanism. A first brake mechanism 100 illustrated in FIG. 5 is an electromagnetic friction brake mechanism. The first brake mechanism 100 includes an armature 98 and a coil 99. The armature 98 is annularly formed of a magnetic body and is provided in the motor housing 21 so as to be movable in the axial direction of the rotation axis Ll. The armature 98 has a first fixed plate 98a, a pressing plate 98b, an outer peripheral portion 98c, and a coupling portion 98d. The first fixed plate 98a presses the first rotating plate 66a-1. The pressing plate 98b is disposed to face the torque receiving plate 68a on the left side in the vehicle width direction with respect to the torque receiving plate 68a. A conversion mechanism 76 having the same configuration as that described with reference to FIG. 3 is provided between the pressing plate 98b and the torque receiving plate 68a.

A straight groove 94 having, for example, a circular cross section is formed in the outer peripheral portion 98c of the armature 98. The straight groove 94 is provided to extend linearly along the axial direction. A plurality of the straight grooves 94 is provided such that the straight grooves 94 are formed at positions equally dividing the circumference about the axis. Each of the straight grooves 94 is surrounded by a wall 98c of the armature 98 on the right side in the vehicle width direction, a wall 72e of the fixed ring 72 on the left side in the vehicle width direction, the inner peripheral portion 72d of the fixed ring 72 on the outer diameter side, and the outer peripheral portion 98c of the armature 98 on the inner diameter side by the fixed ring 72 disposed or. The outer diameter side.

The guide pin 73 is fitted into each straight groove 94. The straight groove 94 and the guide pin 73 act in the same manner as those described with reference to FIG. 2. In other words, the straight groove 94 has a slight play in the circumferential direction about the axis with respect to the guide pin 73. The guide pin 73 and the straight groove 94 limit notation of the armature 98 in the circumferential direction beyond the play and allow the armature 98 to move in the axial direction with respect to the fixed ring 72. The coupling portion 98d supports the second fixed plate 66b-2 and the third fixed plate 66b-3 movable in the axial direction by spline coupling.

In the straight groove 94, the return springs 74, 75 are respectively inserted on both sides of the guide pin 73. The return springs 74, 75 block the guide pin 73 from moving in the axial direction and apply an elastic force against a movement of the armature 98 to the armature 98. For example, the right end of the return spring 74 in the vehicle width direction abuts against the left end of the guide pin 73 in the vehicle width direction. The left end of the return spring 74 in the vehicle width direction abuts against the receiving portion 72c of the recessed portion 72a. The left end of the return spring 75 in the vehicle width direction abuts against the right end of the guide pin 73 in the vehicle width direction. The right end of the return spring 75 in the vehicle width direction abuts against the wall 98e of the armature 98. A sphere may be used in place of the guide pin 73. A plurality of the spheres may be used for each straight groove 94.

The coil 99 is provided in the fixed ring 72 and on the outer peripheral side of the armature 98, and magnetically adsorbs the armature 98 by being energized. The adsorption direction of the armature 98 is the direction in which the first fixed plate 98a presses the first rotating plate 66a-1 toward the axial direction (leftward in the vehicle width direction). The magnetic adsorption force of the armature 98 is greater than the biasing force of the return springs 74, 75. As the armature 98 moves to the left in the vehicle width direction, a friction-based engaging force is generated between the rotating plate 66a and the fixed plates 66b, 98a, and the output shaft 24 of the first motor 13 is braked as a result. The armature 98 acts in the same manner as the pressing member 67 and is an example of a pressing member (in this specification, "the same" also means "substantially the same"). The coil 99 is disposed on the outer diameter side of the armature 98 of the fixed ring 72. Alternatively, the coil 99 may be disposed between the armature 98 and the partition wail 26.

Once the energization of the coil 99 is released, the return springs 74, 75 bias the armature 98 toward the right in the vehicle width direction, that is, toward a direction in which frictional engagement is released. The torque receiving member 68 has the nut portion 68c. The nut portion 68c meshes with the male screw 69a provided in the screw shaft 69. Rotation of the torque receiving member 68 is stopped as described above, and the torque receiving member 68 is moved between the braking position and the initial position by driving of the parking motor 80. The initial position of the torque receiving member 68 is adjusted during parking lock release by an actuator composed of, for example, the detection unit 82 and the controller 83 described with reference to FIG. 2. In FIG. 5, the same reference numerals are given to the same members as those described with reference to FIG. 2 so that detailed description thereof is omitted.

The disclosure is not limited to the configurations of the above-described embodiments, and can be implemented with appropriate modifications within the scope of the claims. For example, although the rotating plate 66a has been described as a configuration rotated by the torque that is transmitted from the first motor 13, the rotating plate 66a may alternatively be configured to be rotated by the torque that is transmitted from an engine. The initial position of the torque receiving member 68 may be adjusted when, for example, the vehicle is stopped instead of when the parking lock is released. In this case, the parking lock and the release may be automatically and quickly performed. In each of the embodiments described above, the friction brake device is a combination of the service brake mechanism 51 and the parking brake mechanism 52. However, the disclosure is not limited thereto, and the service brake mechanism 51 may be used alone with the parking brake mechanism 52 omitted. In this case, the controller may adjust the initial position of the torque receiving member 68 when the vehicle is stopped as described above.

What is claimed is:

1. A brake device comprising:
a rotating member configured to be rotated by torque transmitted from a drive force source;
a fixed member disposed to face the rotating member;
a pressing member configured to generate an engaging force between the rotating member and the fixed member by being pressed in an axial direction of a rotation axis of the rotating member;
an elastic member configured to apply an elastic force against a pressing of the pressing member to the pressing member;
an engaging force application mechanism configured to apply the engaging force to the pressing member;
a torque transmission member configured to transmit torque transmitted from the rotating member to the fixed member, the fixed member including a play along a rotation direction of the rotating member;
a torque receiving member configured to receive the torque transmitted from the torque transmission member, rotation of the torque receiving member in a circumferential direction about the axis being blocked;
a conversion mechanism configured to convert the torque received by the torque receiving member into thrust in the axial direction and apply the thrust resulting from the conversion to the engaging force; and
an actuator configured to move the torque receiving member in the axial direction by generating thrust resulting from rotational-to-linear motion conversion in the torque receiving member and adjust a position of the torque receiving member along the axial direction based on a reaction force against the engaging force.

2. The brake device according to claim 1, wherein the actuator holds the torque receiving member at each of a braking position as a position along the axial direction where the engaging force is generated and an initial position as a position along the axial direction where the engaging force is released and holds the torque receiving member at the braking position when a parking brake is operated.

3. The brake device according to claim 2, wherein the actuator has a detection unit configured to determine the torque transmitted from the rotating member or an axial force in the axial direction resulting from conversion of the torque and adjusts the initial position of the torque receiving member based on the torque or the axial force determined by the detection unit when the parking brake is released.

4. The brake device according to claim 1, wherein the engaging force application mechanism is provided with a hydraulic brake mechanism configured to generate the engaging force by hydraulic pressure supply.

5. The brake device according to claim 1, wherein:
the pressing member has an armature; and
the engaging force application mechanism has a coil and generates the engaging force by moving the armature in the axial direction with a magnetic adsorption force generated by energization of the coil.

* * * * *

UNITED STATES PATENT AND TRADEMARK OFFICE
CERTIFICATE OF CORRECTION

PATENT NO. : 10,844,916 B2
APPLICATION NO. : 16/206116
DATED : November 24, 2020
INVENTOR(S) : Hiroshi Isono Page 1 of 2

It is certified that error appears in the above-identified patent and that said Letters Patent is hereby corrected as shown below:

On the Title Page

Item (71), Applicant 1, city, delete "Toyota" and insert --Toyota-shi Aichi-ken--, therefor.

Item (72), inventor 1, city, delete "Susono" and insert --Susono-shi Shizuoka-ken--, therefor.

Item (73), Assignee, city, delete "Toyota" and insert --Toyota-shi Aichi-ken--, therefor.

In the Specification

In Column 1, Line(s) 25, delete "2035-031387" and insert --2015-031387--, therefor.

In Column 2, Line(s) 36, delete "tire" and insert --the--, therefor.

In Column 2, Line(s) 39, after "released.", delete "P".

In Column 2, Line(s) 47, delete "tire" and insert --the--, therefor.

In Column 3, Line(s) 30, delete "ease" and insert --case--, therefor.

In Column 5, Line(s) 30, delete "4i" and insert --41--, therefor.

In Column 5, Line(s) 43, delete "trot" and insert --not--, therefor.

In Column 5, Line(s) 51, delete "81" and insert --51--, therefor.

In Column 5, Line(s) 53, delete "Tire" and insert --The--, therefor.

In Column 6, Line(s) 33, delete "cylinder The" and insert --cylinder. The--, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,844,916 B2

In Column 6, Line(s) 52, delete "tho" and insert --the--, therefor.

In Column 7, Line(s) 3, delete "result, in" and insert --result. In--, therefor.

In Column 7, Line(s) 7, delete "tire" and insert --the--, therefor.

In Column 7, Line(s) 26, delete "T he" and insert --The--, therefor.

In Column 7, Line(s) 36, delete "die" and insert --the--, therefor.

In Column 7, Line(s) 54, delete "tire" and insert --the--, therefor.

In Column 8, Line(s) 14, delete "68b" and insert --68h--, therefor.

In Column 8, Line(s) 56, after "moved", delete "m" and insert --in--, therefor.

In Column 9, Line(s) 9, delete "tire" and insert --the--, therefor.

In Column 9, Line(s) 57, delete "bet ween" and insert --between--, therefor.

In Column 9, Line(s) 58, delete "tire" and insert --the--, therefor.

In Column 9, Line(s) 58, delete "forcing" and insert --facing--, therefor.

In Column 9, Line(s) 62, delete "tire" and insert --the--, therefor.

In Column 10, Line(s) 7, delete "Use" and insert --the--, therefor.

In Column 12, Line(s) 3, delete "parallel The" and insert --parallel. The--, therefor.

In Column 12, Line(s) 52, delete "94. The" and insert --94, the--, therefor.

In Column 12, Line(s) 62, delete "75 a" and insert --75a--, therefor.

In Column 13, Line(s) 5, after "path", delete ",".

In Column 13, Line(s) 12, after "movable", delete ",".

In Column 13, Line(s) 14, delete "die" and insert --the--, therefor.

In Column 13, Line(s) 48, delete "or. The" and insert --on the--, therefor.

In Column 13, Line(s) 56, delete "notation" and insert --rotation--, therefor.

In Column 14, Line(s) 31, delete "wail" and insert --wall--, therefor.